(12) United States Patent
Martindale et al.

(10) Patent No.: US 6,672,849 B1
(45) Date of Patent: Jan. 6, 2004

(54) QUICK CONNECT/DISCONNECT COUPLING APPARATUS

(75) Inventors: Richard A. Martindale, Vacaville, CA (US); James M. Tuyls, Vacaville, CA (US); Juha K. Salmela, Citrus Heights, CA (US); Bret Baker, Vacaville, CA (US)

(73) Assignee: Automatic Bar Controls, Inc., Vacaville, CA (US)

( * ) Notice: Subject to any disclaimer, the term of this patent is extended or adjusted under 35 U.S.C. 154(b) by 6 days.

(21) Appl. No.: 09/998,701

(22) Filed: Nov. 29, 2001

(51) Int. Cl.[7] .......................... F04B 39/00; B67D 5/40; F16L 21/00
(52) U.S. Cl. ..................... 417/572; 222/374; 285/404
(58) Field of Search .................. 417/572; 222/383.1, 222/372; 285/404, 305, 317, 90; 141/367, 346

(56) References Cited

U.S. PATENT DOCUMENTS

| | | | | |
|---|---|---|---|---|
| 1,098,265 A | * | 5/1914 | James ........................ 285/317 |
| 4,039,213 A | * | 8/1977 | Walters ..................... 285/317 |
| 4,401,324 A | * | 8/1983 | Rumble ....................... 285/90 |
| 4,632,436 A | * | 12/1986 | Kimura ...................... 285/305 |
| 5,159,962 A | * | 11/1992 | Dow .......................... 141/98 |
| 5,682,929 A | * | 11/1997 | Maginot et al. .............. 141/65 |
| 5,709,244 A | * | 1/1998 | Patriquin et al. ....... 137/614.04 |
| 5,829,480 A | * | 11/1998 | Smith, III .............. 137/614.04 |

\* cited by examiner

Primary Examiner—Justine R. Yu
Assistant Examiner—Timothy P. Solak
(74) Attorney, Agent, or Firm—Townsend and Townsend and Crew LLP

(57) ABSTRACT

A coupling apparatus provides quick-connect coupling between a fluid source such as a condiment source and a pump. In specific embodiments, the coupling apparatus comprises a tube, and a fluid source connector coupled to an end of the tube and configured to releasably connect to the fluid source. A quick-connect coupler is coupled to another end of the tube and is configured to releasably connect to the pump inlet fitting of the pump. The quick-connect coupler includes a spring-loaded member being biased by a spring toward a locked position to lock the quick-connect coupler to the pump inlet fitting and being movable to a release position to release the quick-connect coupler from the pump inlet fitting. The quick-connect feature conveniently allows the pump to be easily and quickly disconnected from the dispensing system for cleaning or replacement.

20 Claims, 3 Drawing Sheets

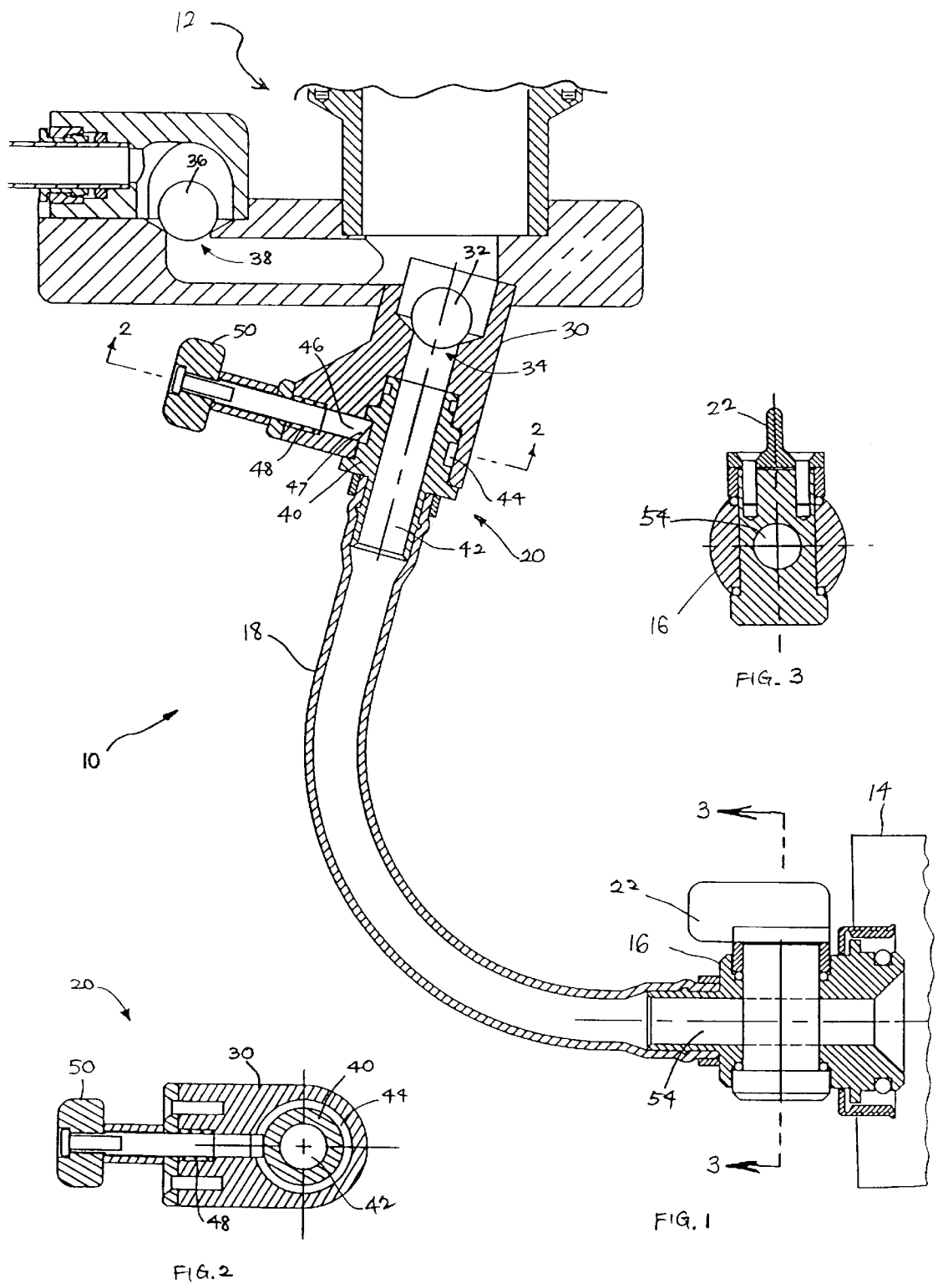

QUICK CONNECT/DISCONNECT COUPLING APPARATUS

BACKGROUND OF THE INVENTION

The present invention relates generally to dispensing apparatus and, more particularly, to an apparatus for dispensing condiments or the like.

Condiment dispensing systems are commonly used in homes, offices, and restaurants. It is desirable to utilize condiment dispensing systems that are readily cleanable and easy to turn on and off and to connect and disconnect. Conventional systems tend to be complex and expensive, and may be difficult to use or may not provide the desired flow for heavy condiment with particulates.

BRIEF SUMMARY OF THE INVENTION

The present invention is directed to a simplified, efficient, and inexpensive way of facilitating condiment flow. A coupling apparatus provides quick-connect coupling between a fluid source such as a condiment source and a pump. In specific embodiments, the coupling apparatus includes a fluid source connector having a flow shut-off valve for connecting to the fluid source. A quick-connect coupler is releasably connected to the inlet of the pump. A tube is connected between the fluid source connector and the quick-connect coupler. The coupling apparatus is simple in construction and easy to use. The quick-connect feature conveniently allows the pump to be easily and quickly disconnected from the dispensing system for cleaning or replacement. This improves sanitation of the delivery system, and extends the life of the pump through regular cleaning and maintenance. A substantially uniform flow passage is provided through the flow shut-off valve, the tube, and the quick-connect coupler, and is particularly advantageous for delivering heavy condiments with particulates from the condiment source to the pump.

In accordance with an aspect of the present invention, an apparatus for connecting a fluid source to a pump having a pump inlet fitting comprises a tube, and a fluid source connector coupled to an end of the tube and configured to releasably connect to the fluid source. A quick-connect coupler is coupled to another end of the tube and is configured to releasably connect to the pump inlet fitting of the pump. The quick-connect coupler includes a spring-loaded member being biased by a spring toward a locked position to lock the quick-connect coupler to the pump inlet fitting and being movable to a release position to release the quick-connect coupler from the pump inlet fitting.

In some embodiments, the tube is flexible. The fluid source connector includes a flow shut-off valve adjustable between an open position to open a flow passage therethrough and a closed position to close the flow passage. The flow passage in the flow shut-off valve is substantially the same in size to a flow path through the tube. The quick-connect coupler includes a flow passage which is substantially the same in size to a flow path through the tube.

In accordance with another aspect of the present invention, a device for coupling a tube to a pump inlet fitting of a pump comprises a body having an outer groove. A sliding member is configured to be slidable in a channel of the pump inlet fitting to engage the outer annular groove in a locked position to lock the quick-connect coupler to the pump inlet fitting and to disengage from the outer annular groove in a release position to release the quick-connect coupler from the pump inlet fitting. A spring biases the sliding member toward the locked position.

In some embodiments, the sliding member comprises a latch having an end which is biased by the spring inward to engage the outer groove in the locked position. The end of the latch is disengaged from the outer groove in the release position by pulling the latch outward away from the outer groove. In different embodiments, the sliding member comprises a shaft having an enlarged portion which is biased by the spring to slide to a position to engage the outer groove in the locked position. The enlarged portion is disengaged from the outer groove in the release position by sliding the shaft to move the enlarged portion away from the outer groove.

In specific embodiments, the shaft is slidable generally tangentially relative to the outer groove. The shaft may be biased by the spring outward from the body to slide to the locked position. The enlarged portion is disengaged from the outer groove in the release position by pushing the shaft in toward the body. The outer groove may comprise an outer annular groove. The body of the quick-connect coupler may be configured to be inserted at least partially into the pump inlet fitting in the locked position.

In accordance with another aspect of the present invention, a device for coupling a tube to a pump inlet fitting of a pump comprises a body having an outer groove. A sliding member is configured to be slidable in a channel of the pump inlet fitting to engage the outer annular groove in a locked position to lock the quick-connect coupler to the pump inlet fitting and to disengage from the outer annular groove in a release position to release the quick-connect coupler from the pump inlet fitting. The sliding member comprises a shaft having an enlarged portion which is slidable to a position to engage the outer groove in the locked position. The enlarged portion is disengaged from the outer groove in the release position by sliding the shaft to move the enlarged portion away from the outer groove. A spring biases the sliding member toward the locked position.

BRIEF DESCRIPTION OF THE DRAWINGS

FIG. 1 is a cross-sectional view of a coupling apparatus for condiment delivery according to an embodiment of the present invention;

FIG. 2 is a cross-sectional view of a quick-connect coupler in the coupling apparatus of FIG. 1 according to an embodiment of the present invention;

FIG. 3 is a cross-sectional view of a flow shut-off valve in the coupling apparatus of FIG. 1 according to an embodiment of the present invention;

DETAILED DESCRIPTION OF THE INVENTION

Figure 4:
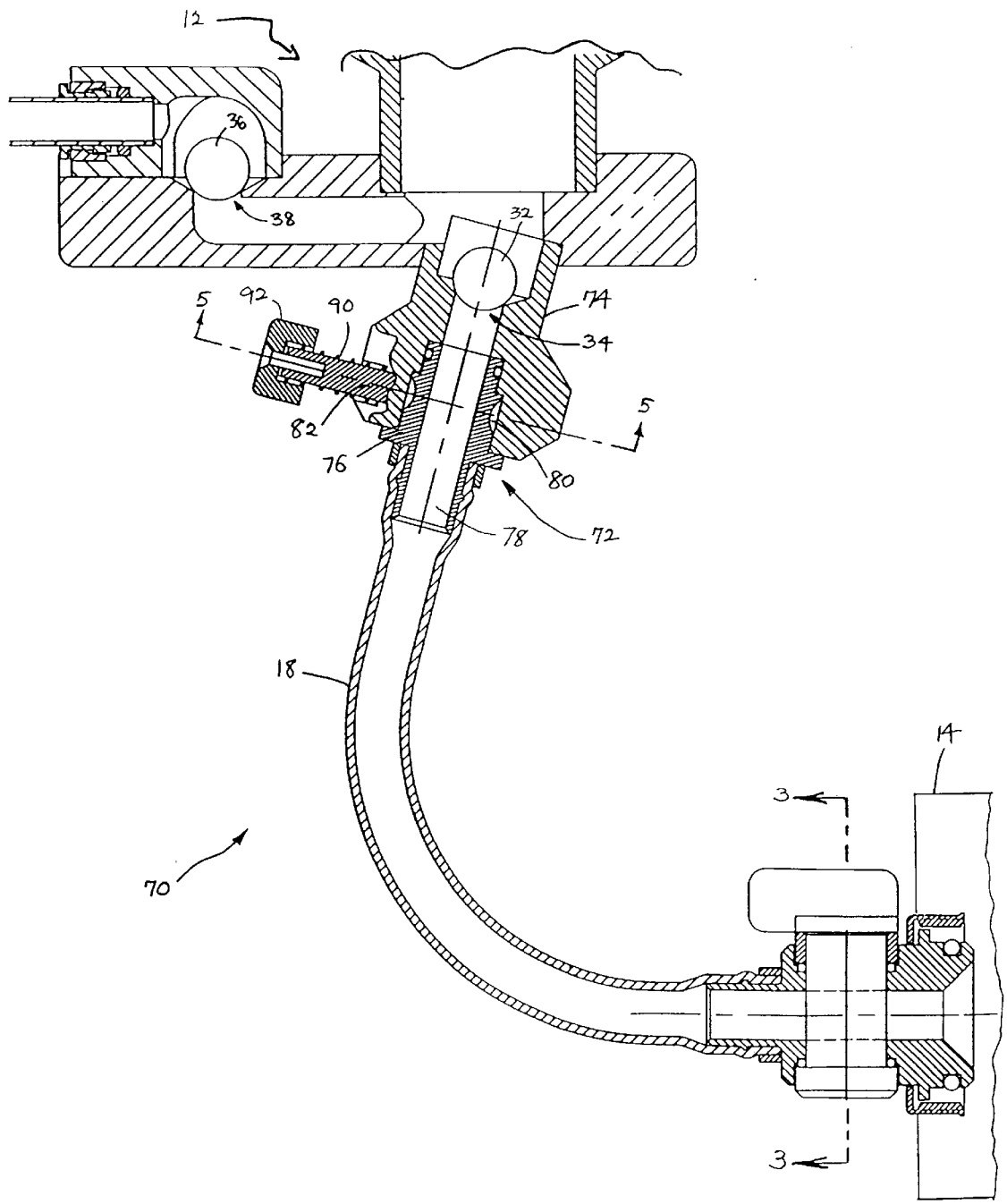
FIG. 4 is a cross-sectional view of a coupling apparatus for condiment delivery according to another embodiment of the present invention.

FIG. 1 shows a coupling apparatus 10 connecting a pump 12 to a fluid source 14. The fluid source 14 may supply condiment in a condiment delivery system. The fluid source 14 may be in the form of a bag in box (BIB) supply. The coupling apparatus 10 includes a fluid source connector 16 which connects a tube 18 at one end to the fluid source 14, and a quick-connect coupler 20 which connects the other end of the tube 18 to the inlet of the pump 12. The tube 18 may be flexible. The fluid source connector 16 desirably includes a flow shut-off valve 22 which is adjustable to open or close the flow path to the pump 12.

The quick-connect coupler 20 is releasably connected to a pump inlet fitting 30 at the inlet of the pump 12, which includes an inlet check valve with an inlet check ball 32 resting on an inlet opening 34. The pump 12 includes an outlet check valve having an outlet check ball 36 resting on an outlet opening 38. Of course, a different pump having a different configuration may be used in other embodiments. In a specific embodiment, the connector 16 is a 38 mm screw type connector for a standard condiment bag.

The quick-connect coupler 20 is a pull-type coupler, as seen in FIGS. 1 and 2. The coupler 20 includes a body 40 with a through passage 42 disposed between the pump inlet opening 34 and the tube 18. The passage 42 desirably is substantially the same in shape and size to the pump inlet opening 34 and the tube 18 to provide a substantially uniform flow path, which is typically round in cross-section. The body 40 is insertable into the pump inlet fitting 30. The body 40 includes an outer groove 44. A slidable member such as a shaft or a latch 46 is biased by a spring 48 to engage the groove 44 to lock the body 40 in place in a locked position and prevent the quick-connect coupler 20 from disconnecting from the pump inlet fitting 30. As shown in FIG. 1, the latch 46 is disposed in a channel of the pump inlet fitting 30 to move inward to engage the groove 44 and outward to separate from the groove 44. A knob 50 is attached to the latch 46 to allow the operator to pull the latch 46 outward to disengage the latch 46 from the groove 44 in a release position, which in turn allows the body 40 of the quick-connect coupler 20 to be disconnected from the pump inlet fitting 30. The outer groove 44 is desirably an annular groove so that the latch 46 may engage the groove 44 without the need to orient the body 40 in a specific angular position. In other embodiments, the outer groove 44 need not be annular.

FIG. 3 shows an embodiment of the shut-off valve 22 in the fluid source connector 16, which is manually adjustable by turning the valve 22 in one direction to close the flow passage 54 and in the opposite direction to open the flow passage 54. The flow passage 54 desirably is substantially the same in shape and size to the tube 18 to provide a substantially uniform flow path, which is typically round in cross-section.

In operation, the condiment bag 14 is placed on a flat surface and supported by the outlet neck in such a manner that no condiment will flow out. The sealed cap is removed from the outlet of the condiment bag 14 and replaced with the fluid source connector 16 having the flow shut-off valve 22. The connector 16 is connected to one end of the tube 18 and the quick-connect coupler 20 is connected to the other end of the tube 18. With the flow shut-off valve 22 in the closed position, the condiment bag 14 can be moved without spillage into the condiment bag holder such as a box for a bag in box configuration. The quick-connect coupler 20 is then simply inserted into the pump inlet fitting 30 and pushed inward until the spring-loaded latch 46 snaps into the groove 44 of the coupler 20 to engage the groove 44 of the body 40 of the quick-connect coupler 20 to lock it in place. To facilitate the insertion of the coupler 20, the latch 46 desirably has a slanted end 47.

FIG. 4 shows another coupling apparatus 70 which employs a different quick-connect coupler 72 and pump inlet fitting 74 from those in FIG. 2. The other components of the coupling apparatus 70 are the same as those in the coupling apparatus of FIG. 2, and the same reference characters are used to designate such components. The quick-connect coupler 72 is releasably connected to the pump inlet fitting 74 at the inlet of the pump 12, and is a push-type coupler instead of a pull-type coupler.

Figure 5A:
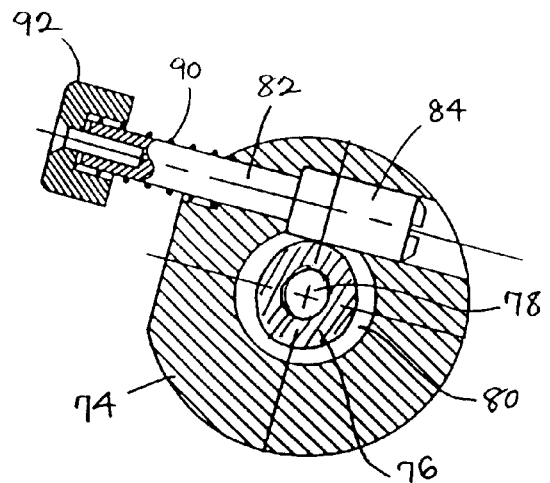
FIG. 5A is a cross-sectional view of a quick-connect coupler in the coupling apparatus of FIG. 1 according to another embodiment of the present invention, illustrating the coupler in a locked position.
Figure 5B:
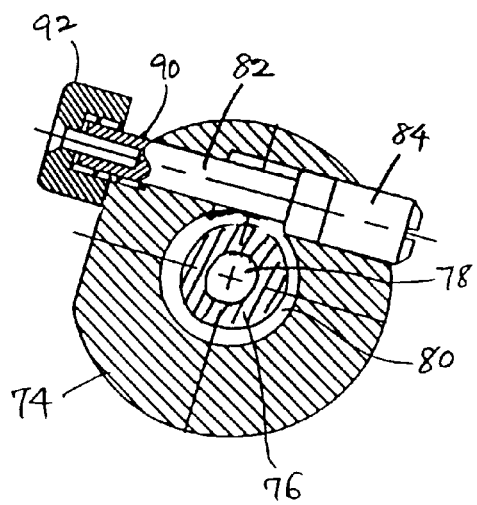
FIG. 5B is a cross-sectional view of the quick-connect coupler of FIG. 5A illustrating the coupler in a release position.

The coupler 72 includes a body 76 with a through passage 78 disposed between the pump inlet opening 34 and the tube 18. The passage 78 desirably is substantially the same in shape and size to the pump inlet opening 34 and the tube 18 to provide a substantially uniform flow path, which is typically round in cross-section. The body 76 includes an outer groove 80, which is desirably an annular groove. A slidable member such as a shaft 82 is slidably disposed in a channel of the pump inlet fitting 74, and includes an enlarged portion 84, as best seen in FIGS. 5A and 5B. The shaft 82 slides generally tangentially relative to the outer groove 80. In FIG. 5A, the enlarged portion 84 is disposed to engage the groove 80 of the body 76 to lock the body 76 in place and prevent the quick-connect coupler 72 from disconnecting from the pump inlet fitting 74. A spring 90 biases the shaft 82 outward to this locked position. A knob 92 is attached to the exposed end of the shaft 82 to allow the operator to push the shaft 82 inward to disengage the enlarged portion 84 from the groove 80, as shown in FIG. 5B. This in turn allows the body 76 of the quick-connect coupler 72 to be disconnected from the pump inlet fitting 74. FIGS. 4–5B show a circular enlarged portion 84 for engaging a curved groove 80. In another embodiment, the enlarged portion 84 and groove 80 may be noncircular, but have a different shape, such as rectangular.

The coupling apparatus 10, 70 are simple in construction and easy to use. The quick-connect feature conveniently allows the pump 12 to be easily and quickly disconnected from the dispensing system for cleaning or replacement. This improves sanitation of the delivery system, and extends the life of the pump through regular cleaning and maintenance. The substantially uniform flow passage through the flow shut-off valve 22, the tube 18, and the quick-connect coupler 20 or 72 is particularly advantageous for delivering heavy condiments with particulates from the condiment bag 14 to the pump 12.

The above-described arrangements of apparatus and methods are merely illustrative of applications of the principles of this invention and many other embodiments and modifications may be made without departing from the spirit and scope of the invention as defined in the claims. For instance, the enlarged portion 84 of the shaft 82 in the embodiment of FIG. 4 may be disposed in a different location such that the spring 90 biases the shaft 82 inward to engage the enlarged portion 84 with the groove 80. In that case, the coupler 72 becomes a pull-type coupler instead of a push-type coupler, and requires the operator to pull the shaft 82 outward to disengage the enlarged portion 84 from the groove 80. The scope of the invention should, therefore, be determined not with reference to the above description, but instead should be determined with reference to the appended claims along with their full scope of equivalents.

What is claimed is:

1. A device for coupling a tube to a pump inlet fitting of a pump, the quick-connect coupler comprising:

a body having an outer groove;

a sliding member configured to be slidable in a channel of the pump inlet fitting to engage the outer groove in a locked position to lock the quick-connect coupler to the pump inlet fitting and to disengage from the outer groove in a release position to release the quick-connect coupler from the pump inlet fitting, the sliding member comprising a shaft having an enlarged portion which is slidable to a position to engage the outer groove in the locked position, the enlarged portion being disengaged from the outer groove in the release position by sliding the shaft to move the enlarged portion away from the outer groove; and a spring biasing the sliding member toward the locked position;

wherein the shaft is biased by the spring outward from the body to slide to the locked position, the enlarged portion being disengaged from the outer groove in the release position by pushing the shaft in toward the body.

2. A device for coupling a tube to a pump inlet fitting of a pump, the quick-connect coupler comprising:

a body having an outer annular groove;

a sliding member configured to be slidable in a channel of the pump inlet fitting to engage the outer annular groove in a locked position to lock the quick-connect coupler to the pump inlet fitting and to disengage from the outer annular groove in a release position to release the quick-connect coupler from the pump inlet fitting; and a spring biasing the sliding member toward the locked position;

wherein the sliding member comprises a shaft having an enlarged portion which is biased by the spring to slide to a position to engage the outer annular groove in the locked position, the enlarged portion being disengaged from the outer annular groove in the release position by sliding the shaft to move the enlarged portion away from the outer annular groove; and wherein the shaft is biased by the spring outward from the body to slide to the locked position, the enlarged portion being disengaged from the outer annular groove in the release position by pushing the shaft in toward the body.

3. The device of claim 2 wherein the sliding member comprises a latch having an end which is biased by the spring inward to engage the outer annular groove in the locked position, the end of the latch being disengaged from the outer annular groove in the release position by pulling the latch outward away from the outer annular groove.

4. The device of claim 2 wherein the body of the quick-connect coupler is configured to be inserted at least partially into the pump inlet fitting in the locked position.

5. A device for coupling a tube to a pump inlet fitting of a pump, the quick-connect coupler comprising:

a body having an outer groove;

a sliding member configured to be slidable in a channel of the pump inlet fitting to engage the outer groove in a locked position to lock the quick-connect coupler to the pump inlet fitting and to disengage from the outer groove in a release position to release the quick-connect coupler from the pump inlet fitting, the sliding member comprising a shaft having an enlarged portion which is slidable to a position to engage the outer groove in the locked position, the enlarged portion being disengaged from the outer groove in the release position by sliding the shaft to move the enlarged portion away from the outer groove; and a spring biasing the sliding member toward the locked position wherein the shaft is slidable generally tangentially relative to the outer groove to the position to engage the outer groove in the locked position.

6. The device of claim 5 wherein the outer groove comprises an outer annular groove.

7. The device of claim 5 wherein the shaft is biased by the spring outward from the body to slide to the locked position, the enlarged portion being disengaged from the outer groove in the release position by pushing the shaft in toward the body.

8. An apparatus for connecting a fluid source to a pump having a pump inlet fitting, the apparatus comprising:

a tube;

a fluid source connector coupled to an end of the tube and configured to releasably connect to the fluid source; and a quick-connect coupler coupled to another end of the tube and configured to releasably connect to the pump inlet fitting of the pump, the quick-connect coupler including a spring-loaded member being biased by a spring toward a locked position to lock the quick-connect coupler to the pump inlet fitting and being movable to a release position to release the quick-connect coupler from the pump inlet fitting, wherein the quick-connect coupler comprises a body having an outer groove, and wherein the spring-loaded member is configured to be slidable in a channel of the pump inlet fitting to engage the outer groove in the locked position to lock the quick-connect coupler to the pump inlet fitting and to disengage from the outer groove in the release position to release the quick-connect coupler from the pump inlet fitting;

wherein the spring-loaded member comprises a shaft having an enlarged portion which is biased by the spring to slide to a position to engage the outer groove in the locked position, the enlarged portion being disengaged from the outer groove in the release position by sliding the shaft to move the enlarged portion away from the outer groove; and wherein the shaft is slidable generally tangentially relative to the outer groove to the position to engage the outer groove in the locked position.

9. The apparatus of claim 8 wherein the tube is flexible.

10. The apparatus of claim 8 wherein the fluid source connector includes a flow shut-off valve adjustable between an open position to open a flow passage therethrough and a closed position to close the flow passage.

11. The apparatus of claim 10 wherein the flow passage in the flow shut-off valve is substantially the same in size to a flow path through the tube.

12. The apparatus of claim 8 wherein the quick-connect coupler includes a flow passage which is substantially the same in size to a flow path through the tube.

13. The apparatus of claim 8 wherein the spring-loaded member comprises a latch having an end which is biased by the spring inward to engage the outer groove in the locked position, the end of the latch being disengaged from the outer groove in the release position by pulling the latch outward away from the outer groove.

14. The apparatus of claim 8 wherein the shaft is biased by the spring outward from the body to slide to the locked position, the enlarged portion being disengaged from the outer groove in the release position by pushing the shaft in toward the body.

15. The apparatus of claim 8 wherein the outer groove comprises an outer annular groove.

16. The apparatus of claim 8 wherein the body of the quick-connect coupler is configured to be inserted at least partially into the pump inlet fitting in the locked position.

17. A device for coupling a tube to a pump inlet fitting of a pump, the quick-connect coupler comprising:

a body having an outer annular groove;

a sliding member configured to be slidable in a channel of the pump inlet fitting to engage the outer annular groove in a locked position to lock the quick-connect coupler to the pump inlet fitting and to disengage from the outer annular groove in a release position to release the quick-connect coupler from the pump inlet fitting; and a spring biasing the sliding member toward the locked position;

wherein the sliding member comprises a shaft having an enlarged portion which is biased by the spring to slide to a position to engage the outer annular groove in the locked position, the enlarged portion being disengaged from the outer annular groove in the release position by sliding the shaft to move the enlarged portion away from the outer annular groove; and wherein the shaft is slidable generally tangentially relative to the outer annular groove to the position to engage the outer annular groove in the locked position.

18. The device of claim 17 wherein the sliding member comprises a latch having an end which is biased by the spring inward to engage the outer annular groove in the locked position, the end of the latch being disengaged from the outer annular groove in the release position by pulling the latch outward away from the outer annular groove.

19. The device of claim 17 wherein the shaft is biased by the spring outward from the body to slide to the locked position, the enlarged portion being disengaged from the outer annular groove in the release position by pushing the shaft in toward the body.

20. The device of claim 17 wherein the body of the quick-connect coupler is configured to be inserted at least partially into the pump inlet fitting in the locked position.

* * * * *